United States Patent
Kudou et al.

(10) Patent No.: US 8,335,845 B2
(45) Date of Patent: Dec. 18, 2012

(54) WEB APPLICATION MANAGEMENT METHOD AND WEB SYSTEM

(75) Inventors: Masahiro Kudou, Fujisawa (JP); Tomohiro Nakamura, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 364 days.

(21) Appl. No.: 12/708,295

(22) Filed: Feb. 18, 2010

(65) Prior Publication Data

US 2011/0047208 A1 Feb. 24, 2011

(30) Foreign Application Priority Data

Jun. 16, 2009 (JP) ................................. 2009-142948

(51) Int. Cl.
*G06F 15/173* (2006.01)
(52) U.S. Cl. ......... 709/223; 709/203; 709/217; 709/224
(58) Field of Classification Search .................. 709/203, 709/217, 219, 223, 224, 229
See application file for complete search history.

(56) References Cited

U.S. PATENT DOCUMENTS

| | | | |
|---|---|---|---|
| 6,853,782 B2 * | 2/2005 | Kobayashi et al. ........... 385/113 |
| 6,865,508 B2 * | 3/2005 | Ueki et al. ..................... 702/181 |
| 7,567,979 B2 * | 7/2009 | Prasad et al. ........................... 1/1 |
| 7,647,561 B2 * | 1/2010 | Zondervan et al. ........... 715/762 |
| 7,653,896 B2 * | 1/2010 | Herdeg, III .................... 717/113 |
| 7,694,311 B2 * | 4/2010 | Amir et al. ..................... 719/320 |
| 7,853,684 B2 * | 12/2010 | Koch et al. ..................... 709/224 |
| 2004/0073644 A1 * | 4/2004 | Koch et al. ..................... 709/223 |
| 2004/0181366 A1 * | 9/2004 | Urokohara .................... 702/182 |
| 2006/0282494 A1 * | 12/2006 | Sima et al. ..................... 709/200 |
| 2007/0118575 A1 * | 5/2007 | Kanda et al. ................... 707/204 |
| 2007/0143306 A1 * | 6/2007 | Yang ................................. 707/10 |
| 2007/0233882 A1 * | 10/2007 | Mariani et al. ................. 709/229 |
| 2008/0126931 A1 * | 5/2008 | Kojima et al. ................. 715/704 |
| 2008/0177877 A1 | 7/2008 | Naono et al. |
| 2008/0209030 A1 * | 8/2008 | Goldszmidt et al. .......... 709/224 |
| 2008/0294594 A1 * | 11/2008 | Hamaguchi et al. .............. 707/1 |
| 2009/0106769 A1 | 4/2009 | Nakamura |

(Continued)

FOREIGN PATENT DOCUMENTS

JP 06-195162 7/1994

(Continued)

OTHER PUBLICATIONS

Furukawa, Masatoshi, et al.; Operability Evaluation/Improvement Method for Web Application and Web System; 2008; pp. 1-16.

*Primary Examiner* — LaShonda Jacobs
(74) *Attorney, Agent, or Firm* — Foley & Lardner LLP

(57) ABSTRACT

Operability of a web application comprising dynamic contents is evaluated continuously with high precision. In a web application execution system 1000, a web server apparatus 121 responsive to a request from a client apparatus 101 and a log server apparatus 141 are connected via a network 161. The log server apparatus 141 stores an operation log obtained when the web application is operated on the web browser in accordance with a manual having a description of an operation method of the web application, as a first operation log, stores another operation log obtained when the web application is operated in the client apparatus 101, as a second operation log, and transmits difference information between the first and second operation logs to the web server apparatus 121, the client apparatus 101 or a different external apparatus 181 to cause the difference information to be at least displayed or recorded.

8 Claims, 16 Drawing Sheets

U.S. PATENT DOCUMENTS

2012/0143947 A1* 6/2012 Kikuchi .................. 709/203

FOREIGN PATENT DOCUMENTS

| | | |
|---|---|---|
| JP | 09-062470 | 3/1997 |
| JP | 2002-183369 | 6/2002 |
| JP | 2003-108407 A | 4/2003 |
| JP | 2004-86373 | 3/2004 |
| JP | 2005-332327 | 12/2005 |
| JP | 2008-181279 | 8/2008 |
| JP | 2008-288659 | 11/2008 |
| JP | 2009-104267 | 5/2009 |

* cited by examiner

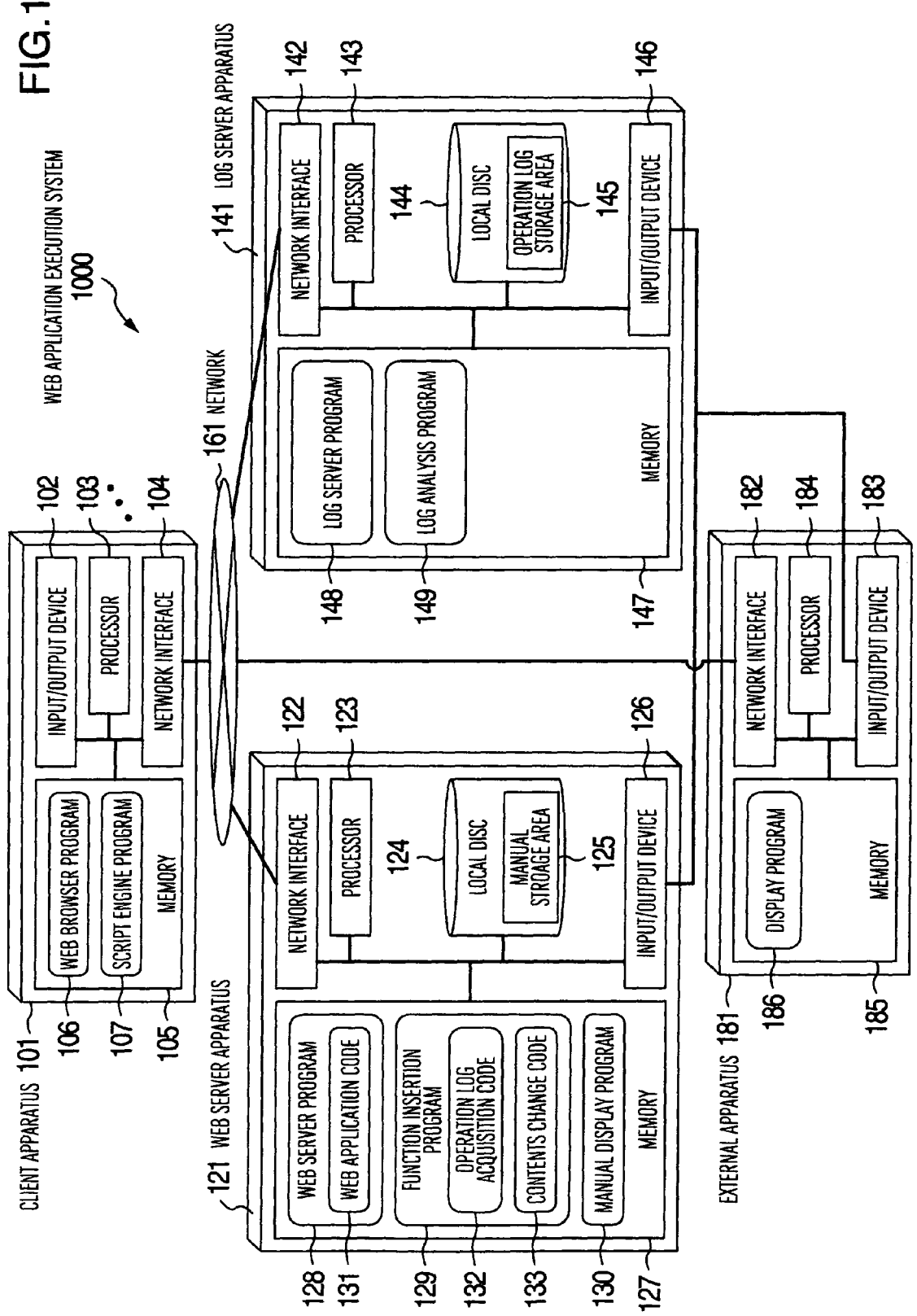

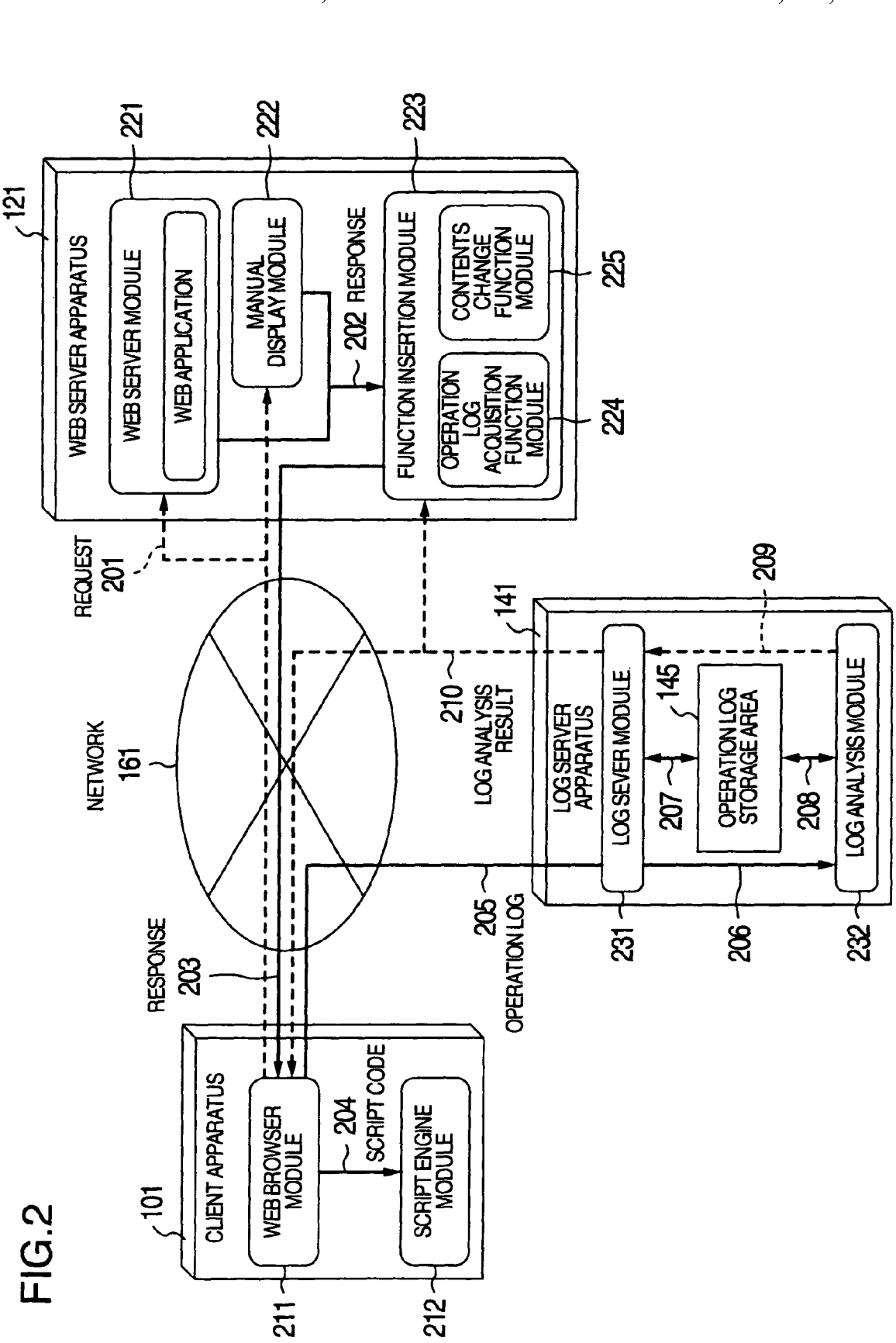

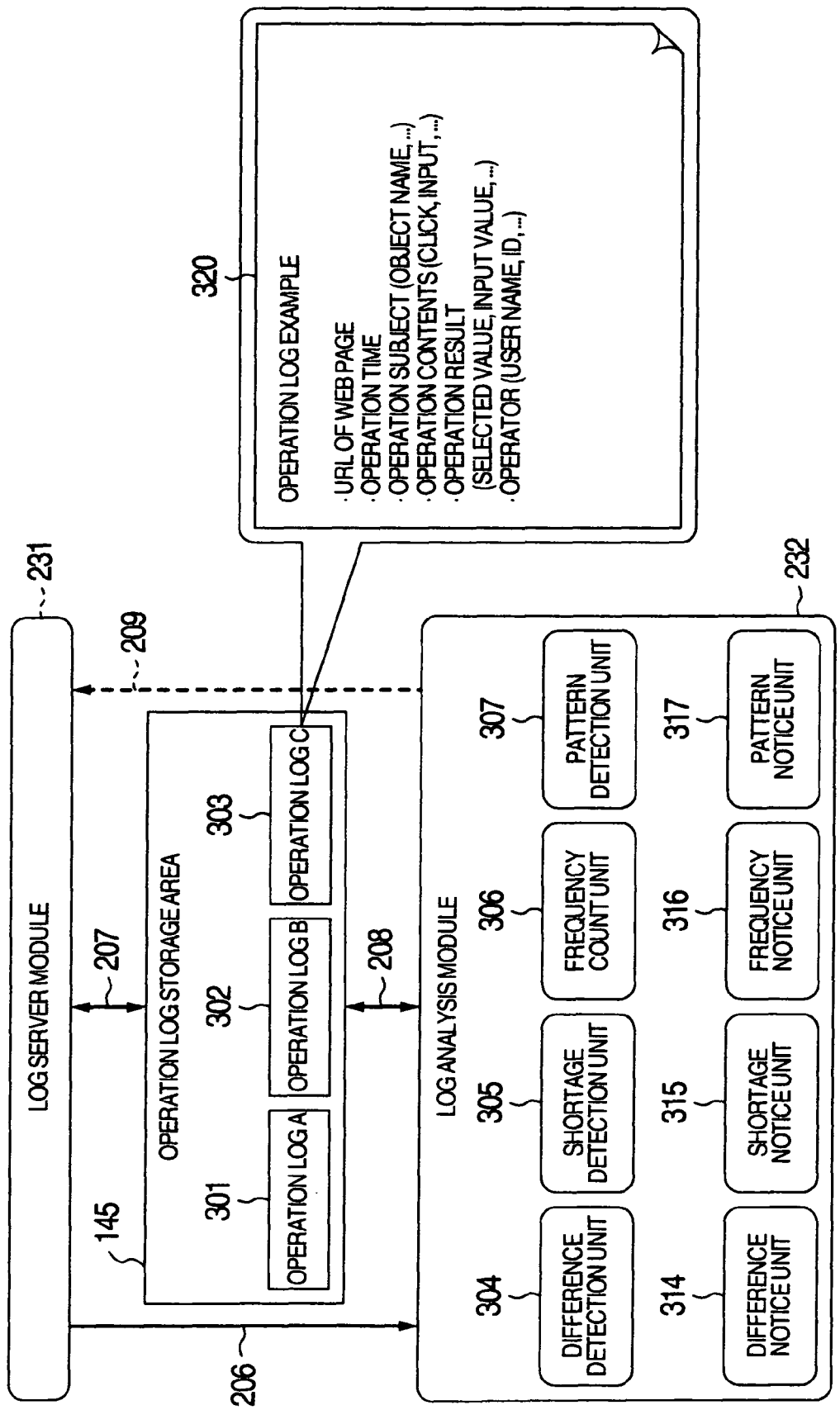

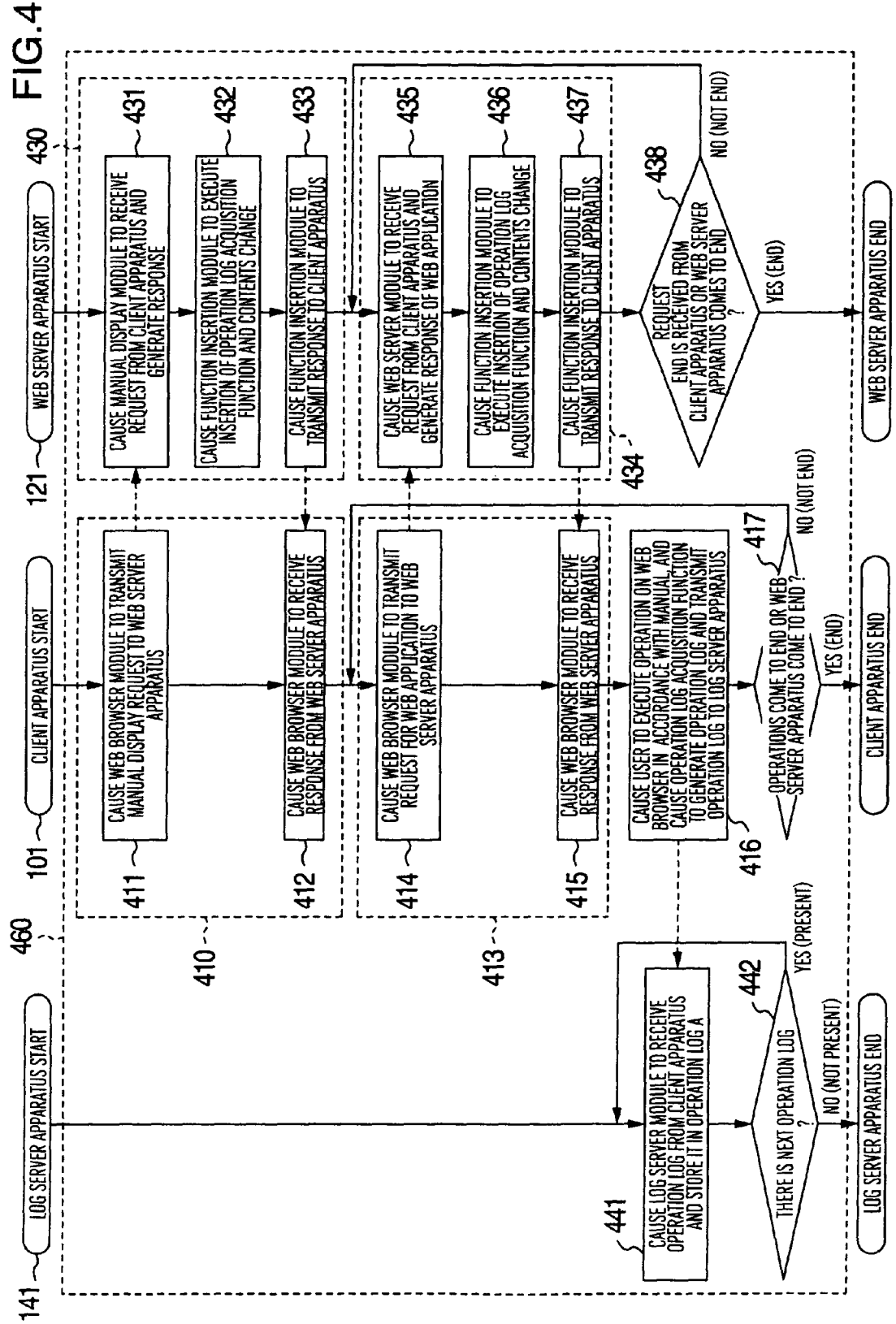

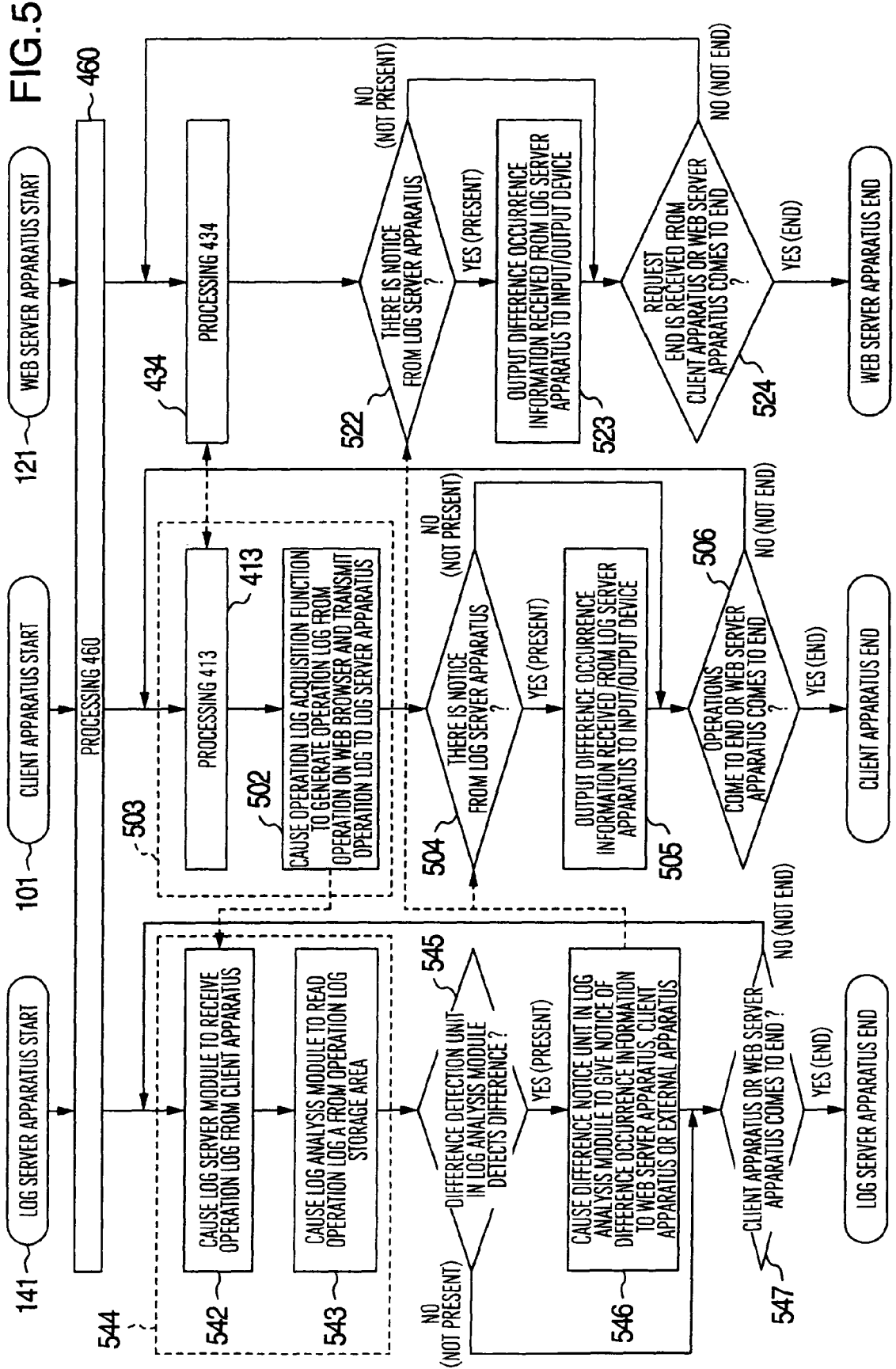

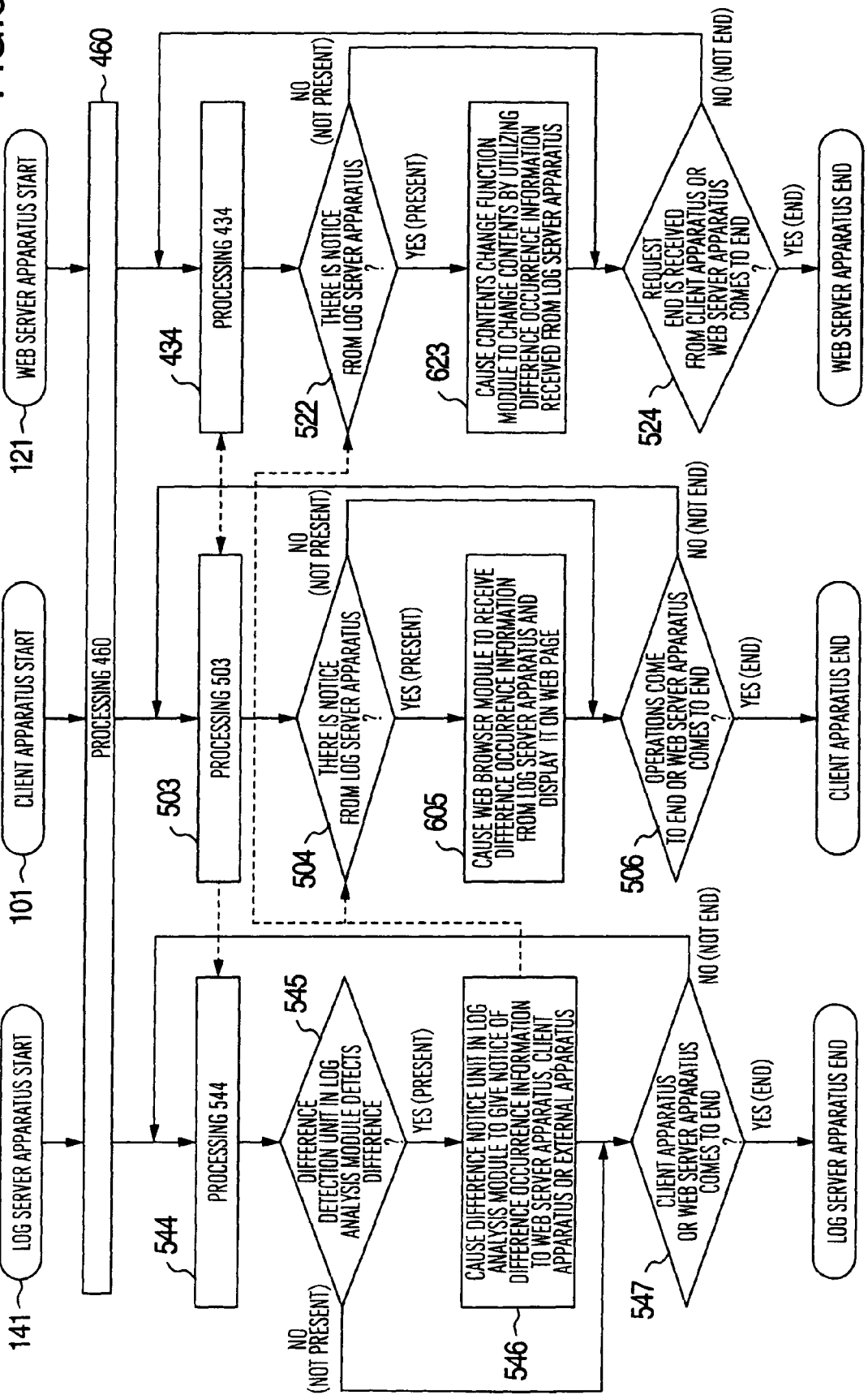

701

EXAMPLE OF DIFFERENCE OCCURRENCE INFORMATION
· URL OF WEB PAGE
· DIFFERENCE OCCURRENCE CONTENTS
 (OPERATION OBJECT, OPERATION CONTENTS, OPERATION RESULT,...)
· OPERATION RECORDED IN OPERATION LOG A
 (OPERATION OBJECT, OPERATION CONTENTS, OPERATION RESULT,...)

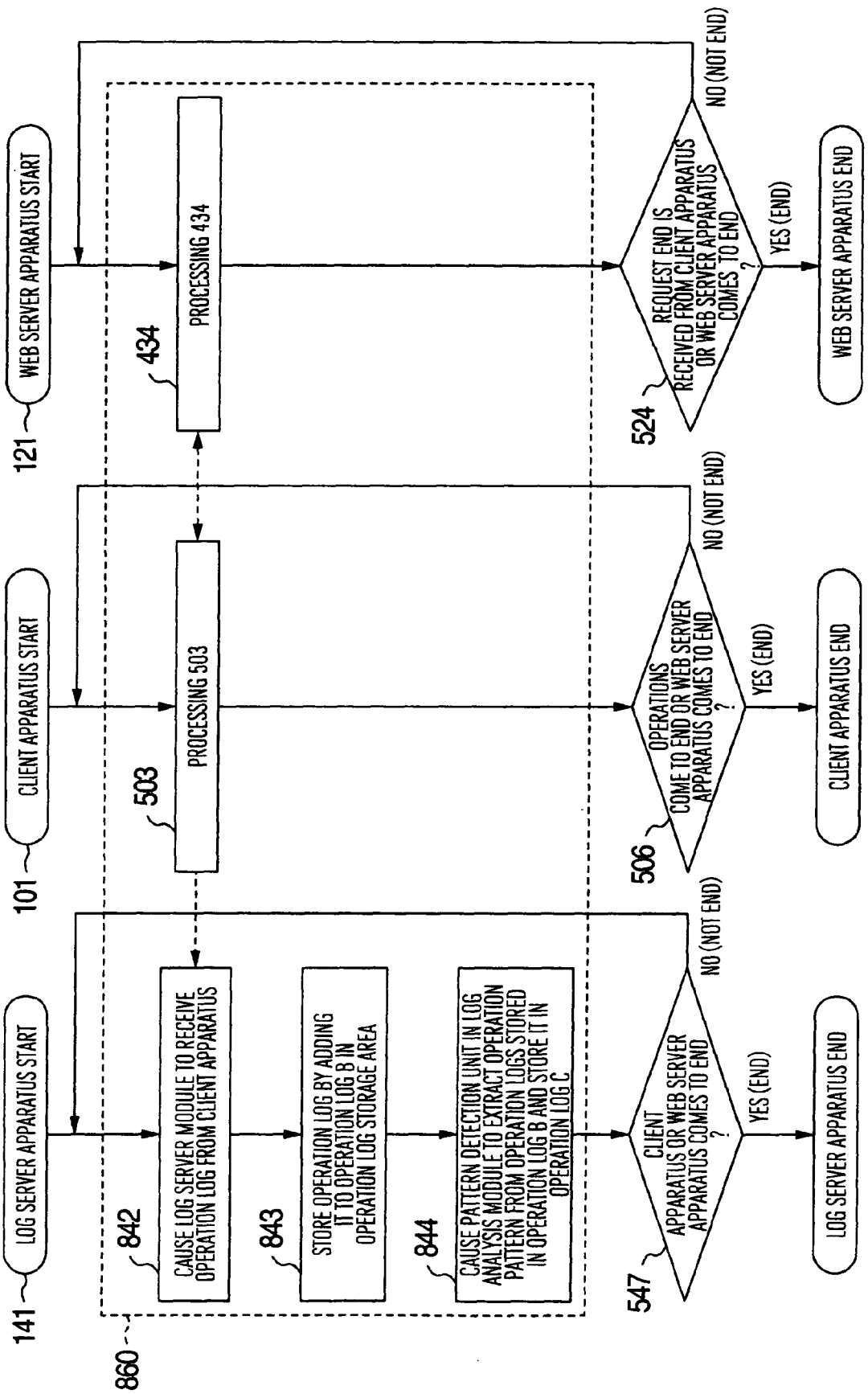

FIG.13A

```
1301
EXAMPLE OF DIFFERENCE OCCURRENCE INFORMATION
 · URL OF WEB PAGE
 · DIFFERENCE OCCURRENCE CONTENTS
   (OPERATION OBJECT, OPERATION CONTENTS, OPERATION RESULT,...)
 · OPERATION RECORDED IN OPERATION LOG A
   (OPERATION OBJECT, OPERATION CONTENTS, OPERATION RESULT,...)
 · OPERATION RECORDED IN OPERATION LOG C
   (OPERATION OBJECT, OPERATION CONTENTS, OPERATION RESULT,...)
```

EXAMPLE OF MANUAL CHANGE

· OPERATION METHOD
 – FIRST, CONDUCT ○○○
 – THEN, CONDUCT △△△

1303

– NOW, CONDUCT THE FOLLOWING OPERATION

□ WEB BROWSER

WEB APPLICATION

INPUT ITEM 1 [           ]

INPUT ITEM 2 [           ]

SELECTION ITEM 1 [ SELECTION VALUE 1  ▽ ]

SELECTION ITEM 2  ○ SELECTION VALUE 1   ⦿ SELECTION VALUE 2   ○ SELECTION VALUE 3    ---1304

SELECTION ITEM 3  ☑ SELECTION VALUE 1   ☐ SELECTION VALUE 2   ☑ SELECTION VALUE 3

[ BUTTON 1 ] [ BUTTON 2 ] [ BUTTON 3 ] [ BUTTON 4 ]

– THEN, CONDUCT OPERATION □□□

FIG.15A

EXAMPLE OF DIFFERENCE OCCURRENCE INFORMATION
· URL OF WEB PAGE
· DIFFERENCE (OMISSION OF OPERATION) OCCURRENCE CONTENTS
  (OPERATION OBJECT, OPERATION CONTENTS, OPERATION RESULT,...)
· OPERATION RECORDED IN OPERATION LOG A
  (OPERATION OBJECT, OPERATION CONTENTS, OPERATION RESULT,...)
· OPERATION RECORDED IN OPERATION LOG C
  (OPERATION OBJECT, OPERATION CONTENTS, OPERATION RESULT,...)

FIG.15B

WEB BROWSER

WEB APPLICATION

INPUT ITEM 1

INPUT ITEM 2

SELECTION ITEM 1 — SELECTION VALUE 1

SELECTION ITEM 2 — ○ SELECTION VALUE 1   ● SELECTION VALUE 2   ○ SELECTION VALUE 3

SELECTION ITEM 3 — ☑ SELECTION VALUE 1   ☐ SELECTION VALUE 2   ☑ SELECTION VALUE 3

BUTTON 1   BUTTON 2   BUTTON 3   BUTTON 4

FIG.16A

EXAMPLE OF DIFFERENCE OCCURRENCE INFORMATION
· URL OF WEB PAGE
· DIFFERENCE (OPERATION MISTAKE) OCCURRENCE CONTENTS
  (OPERATION OBJECT, OPERATION CONTENTS, OPERATION RESULT,...)
· OPERATION RECORDED IN OPERATION LOG A
  (OPERATION OBJECT, OPERATION CONTENTS, OPERATION RESULT,...)
· OPERATION RECORDED IN OPERATION LOG C
  (OPERATION OBJECT, OPERATION CONTENTS, OPERATION RESULT,...)

FIG.16B

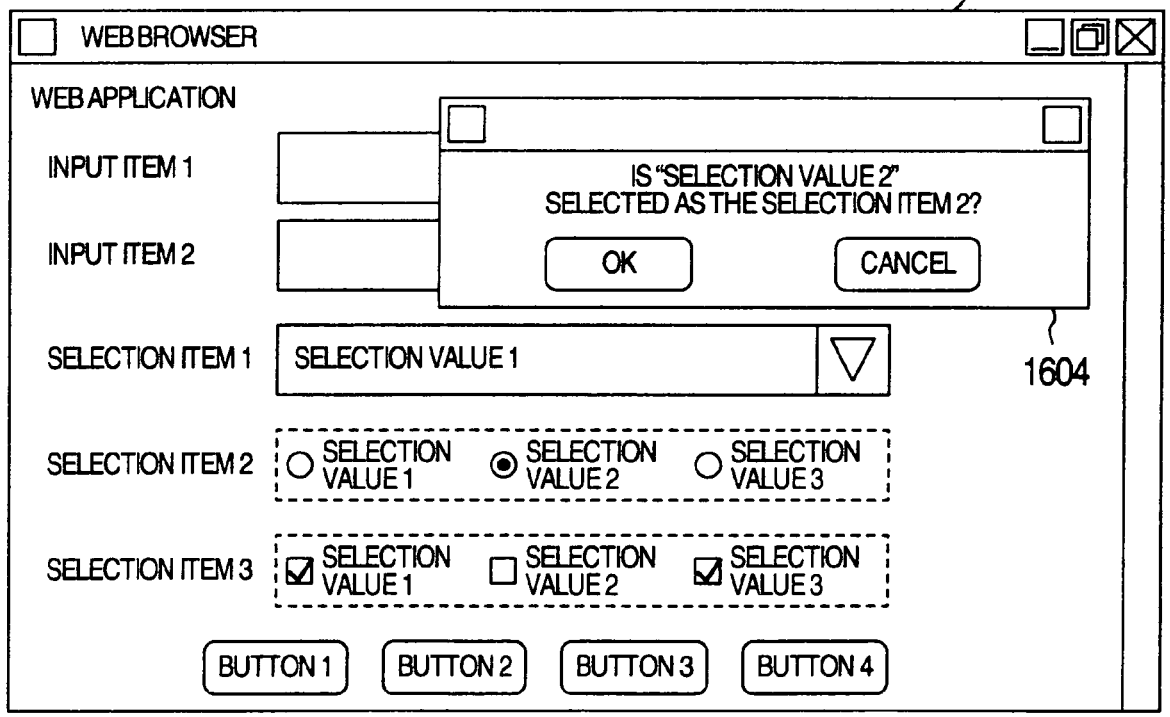

WEB APPLICATION MANAGEMENT METHOD AND WEB SYSTEM

INCORPORATION BY REFERENCE

The present application claims priority from Japanese application JP2009-142948 filed on Jun. 16, 2009, the content of which is hereby incorporated by reference into this application.

BACKGROUND OF THE INVENTION

The present invention relates to a web application managing method and a web system. In particular, the present invention relates to a management method, and web system, concerning evaluation and improvement of operability of web applications.

In recent years, various services are implemented by using web applications. They are utilized in a large number of scenes such as B2C (Business to Consumer), B2B (Business to Business), and B2E (Business to Employee) because of convenience that they can be utilized by using only a widespread web browser.

Development environments of web applications have been diversified and enriched. In other words, owing to spread of the lightweight script language and provision of low-cost development environments which are rich in functions, it has become possible for a person or an enterprise other than big enterprises which are rich in experts and resources to develop a web application and provide service on the web. Web service of user participation type has also appeared. It has become frequent that the case where contents provided by the web service dynamically change is also seen. The utilization scene of the web service exhibits spread.

From such a background, a large number of similar services are provided, and competition between services has become fierce. Because of repletion of the development enrichment described above, a great difference is disappearing in any service in the aspect of the function. For winning in the competition between services, easiness to use (operability) of the user has become important. A technique for automatically improving the operability is demanded especially to cope with the case where contents dynamically change.

On the other hand, in a method frequently used as the conventional art, a video image of the user's operation on the web application is picked up and an expert watches the video image and evaluates the operability. Since it takes time, however, this method is not suitable for a large amount of continuous evaluation. In addition, since the expert is relied upon to evaluate the operability, a bias is caused in the aspect of evaluation precision or stability is insufficient. The method has these problems.

For example, in JP-A-2004-86373, a technique of generating an operation pattern in accordance with a guide line beforehand, comparing user's operation with the operation pattern, judging an error pattern, and displaying the guide line is disclosed. This technique has two problems. A first problem is a problem of a high cost required to generate the operation pattern in accordance with the guide line. A second problem is a problem that a measure to dynamically changing contents is insufficient. As for the second problem, it is difficult from the aspect of the cost to change the guide line in conformity with dynamically changing contents. In addition, a suitable guidance cannot be given for dynamically changing contents by judging a difference in operation pattern to be an error pattern and guiding to the operation according to the guide line. They are especially problems.

In JP-A-2002-183369, a method of causing the user to conduct operation in accordance with a directive, detecting an operations which took a long time or an operation which is abound with errors, and making a proposal for improvement is disclosed. In this method, however, it is necessary to previously generate an operation record according to a directive. For dynamically changing contents, it is also necessary to generate a record of operations according to a directive in conformity with the dynamically changing contents. If an operation requires a time which remarkably exceeds a time considered to be suitable from the view of human engineering, the operation is defined as time-consuming operation. However, it is doubtful whether detection with sufficiently high precision can be conducted with this method.

SUMMARY OF THE INVENTION

In view of the circumstances described above, an object of the present invention is to evaluate operability of a web application continuously with high precision. In the method relying upon human labor such as video image pickup as in the conventional art, large quantities of continuous evaluation is difficult, and the precision is not high because the method relies upon the subjective point of view of the evaluator.

Another object of the present invention is to implement the evaluation of the operability of the web application for a web application comprising dynamic contents as well in the same way. If it is attempted to cope with a web application comprising dynamic contents in the case where it is necessary to previously give an application pattern according to a guide line or directive, it is necessary to generate a guide line or directive itself or an operation pattern according to the guide line or directive each time, and it is not realistic.

Still another object of the present invention is to implement automatic improvement of operability in response to evaluation of the operability of the web application. In the conventional art, there is a scheme in which a guide line is presented against an erroneous operation. However, the guide line must be previously given, and there is a possibility that the guide line will not be a suitable guide line at time when the guide line is presented.

In other words, an object of the present invention is to evaluate operability of a web application comprising dynamic contents continuously with high precision. Another object of the present invention is to improve the operability on the basis of the evaluation.

In order to accomplish the objects, in a web system according to the present invention, a web server apparatus responsive to a request from a client apparatus and a log server apparatus are connected via a network. The log server apparatus stores an operation log obtained when a web application is operated on the web browser in accordance with a manual having a description of an operation method of the web application, as a first operation log, and stores another operation log obtained when the web application is operated in the client apparatus 101, as a second operation log. The log server apparatus compares the first operation log with the second operation log. If there is a difference part, then the log server apparatus transmits difference information to the web server apparatus, the client apparatus or a different external apparatus to cause the difference information to be at least displayed or recorded.

Other objects, features and advantages of the invention will become apparent from the following description of the embodiments of the invention taken in conjunction with the accompanying drawings.

BRIEF DESCRIPTION OF THE DRAWINGS

FIG. 1 is a general configuration diagram of web application execution systems in first to seventh embodiments;

FIG. 2 is a diagram showing a processing flow of web application execution systems in the first to seventh embodiments;

FIG. 3 is a configuration diagram of a log sever apparatus in the first to seventh embodiments;

FIG. 4 is a processing flow diagram of operation log generation in the first embodiment;

FIG. 5 is a processing flow diagram of operability evaluation in the first embodiment;

FIG. 6 is a processing flow diagram of operability evaluation in the second embodiment;

FIG. 8 is a processing flow diagram of operation log generation in the third embodiment;

FIGS. 13A and 13B are diagrams showing an example of a change of a manual in the sixth embodiment;

FIGS. 15A and 15B are diagrams showing a display example of operability improvement in the seventh embodiment; and FIGS. 16A and 16B are diagrams showing a different display example of operability improvement in the seventh embodiment.

DESCRIPTION OF THE EMBODIMENTS

Figures 7A, 7B:
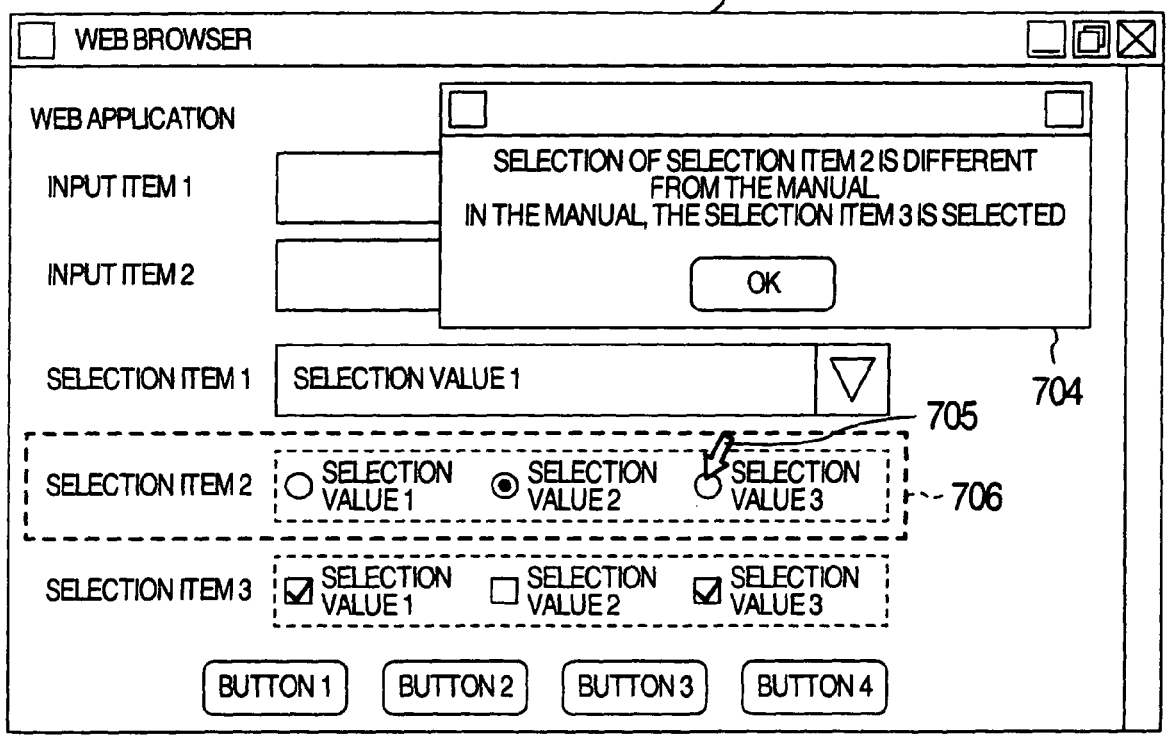
FIGS. 7A and 7B are diagrams showing a display example of an operability evaluation result in the second embodiment.

Hereafter, embodiments of the present invention will be described with reference to the drawings.

(First Embodiment)

A first embodiment of the present invention will be described with reference to FIGS. 1 to 5.

As shown in FIG. 1, a web application execution system 1000 (web system) in the first (to seventh) embodiment(s) includes at least one client apparatus 101, a web server apparatus 121, a log server apparatus 141, an external apparatus 181, and a network 161 for connecting these apparatuses, as hardware. By the way, the external apparatus 181 is not indispensable, and at least two pieces of hardware in each apparatus may be implemented by one piece of hardware.

Each of the web apparatus 101, the web server apparatus 121, the log server apparatus 141 and the external apparatus 181 includes a processor (103, 123, 143 or 184), a memory (105, 127, 147 or 185), an input/output device (102, 126, 146 or 183), and a network interface (104, 122, 142 or 182), and they are connected to each other. Each of the web server apparatus 121 and the log server apparatus 141 further includes a local disc (124 or 144).

A web browser program 106 and a script engine program 107 (program execution engine program) are stored in the memory 105 in the client apparatus 101. These programs are read into the processor 103 and executed.

The web browser program 106 has a function of requesting a web page, receiving a response of the requested web page, interpreting the response, and generating a display screen. The script engine program 107 has a function of interpreting a script code comprised in the response of the web page and executing processing written in the script code, in the processor 103.

A keyboard, a mouse and a monitor are connected to the input/output device 102. The input/output device 102 is utilized to give a directive to execute or stop a program and display an execution result of the program on the monitor. The processor 103 reads a program from the memory 105 and executes processing. The network interface 104 conducts transmission and reception of a request and a response with the web server apparatus 121 and conducts transmission and reception of an operation log with an apparatus external to the client apparatus 101 via the network 161.

A web server program 128, a function insertion program 129, and a manual display program 130 are stored in the memory 127 in the web server apparatus 121. A web application code 131 is comprised in the web server program 128 or placed in juxtaposition with the web server program 128. An operation log acquisition code 132 and a contents change code 133 are comprised in the function insertion program 129. These programs are read into the processor 123 and executed.

The web server program 128 has a function of generating a response of a web page (a page generated by the web application) and returning the response, in response to a request. With respect to the response of a web page, the function insertion program 129 has a function of adding or correcting contents comprised in the response.

The input/output device 126, the processor 123 and the network interface 122 have the same functions as those of devices having the same names included in the client apparatus 101. A manual storage area 125 is included in the local disc 124.

A log server program 148 and a log analysis program 149 are stored in the memory 147 in the log server apparatus 141. These programs are read into the processor 143 and executed.

The log server program 148 has a function of receiving an operation log transmitted from the client apparatus 101, and transmitting a log analysis result, which will be described later, to the web server apparatus 121 or the external apparatus 181. An operation log storage area 145 for storing an operation log is provided on the local disc 144.

The log analysis program 149 has a log analysis function to receive operation logs from the operation log storage area 145 or the log server program 148, detect a difference between operation logs, detect a frequently appearing operation pattern, and give notice of a result of the detection to the log server program 148.

The input/output device 146, the processor 143 and the network interface 142 have the same functions as those of devices having the same names included in the web server apparatus 121.

A processing flow in the web application execution system 1000 in the first (to seventh) embodiment(s) will now be described with reference to first FIG. 2 and then FIG. 3. In the web application execution system 1000 in which the client apparatus 101, the web server apparatus 121 and the log server apparatus 141 are connected via the network 161, the client apparatus 101 transmits a request of a web page, and the web server apparatus 121 generates and returns a response of the requested web page, as described with reference to FIG. 1. Then, the web page is displayed and a script code is executed in the client apparatus 101, and an operation log is transmitted to the log server apparatus 141 and analyzed. A series of processing thus conducted until notice of the result of the analysis is given will now be described in order. By the way, in FIG. 2 and subsequent drawings, a state in which a program is being executed on a processor is referred to as module. For example, if the web browser program is being executed on a processor, it is called web browser module.

First, a web browser module 211 (corresponding to the web browser program 106) in the client apparatus 101 transmits a web page request 201 (hereafter the reference numeral "201" is omitted in some cases) to the web server apparatus 121 via the network 161 as shown in FIG. 2. At least URI (Uniform Resource Identifiers) which specify a place where there is the web page are comprised in the request 201. In the web server apparatus 121, a web server module 221 (corresponding to the web server program 128) receives the request 201, and generates a response 202 of the requested web page (hereafter the reference numeral "202" is omitted in some cases).

The response 202 is transmitted to the web browser module 211 in the client apparatus 101 via a function insertion module 223 (corresponding to the function insertion program 129) included in the web server apparatus 121, as a response 203 (for example, an HTML (Hyper Text Markup Language) document). An operation log acquisition function module 224 (corresponding to the operation log acquisition code 132) in the function insertion module 223 inserts a function of acquiring an operation log on the web browser module 211, in a form of a script code 204 executed on a script engine module 212 (corresponding to the script engine module 107) included in the client apparatus 101. A contents change function module 225 (corresponding to the contents change code 133) has a function of changing a part of contents comprised in the response 202.

In the client apparatus 101, contents comprised in the response 203 are displayed by the web browser module 211. The next request is transmitted according to an operation, or the script code 204 comprised in contents is executed by the script engine module 212. The script code inserted by the operation log acquisition function module 224 is also executed by the script engine module 212 to generate an operation log on the web browser module 211. An operation log 205 is transmitted from the web browser module 211 to the log server apparatus 141.

In the log server apparatus 141, a log server module 231 (corresponding to the log server program 148) receives the operation log 205 from the client apparatus 101, and stores it in the operation log storage area 145 (reference numeral 207). A log analysis module 232 (corresponding to the log analysis program 149) reads an operation log from the operation log storage area 145 or the log server module 231 (reference numerals 206 and 208), detects a difference between operation logs, detects a frequently appearing operation pattern, and gives notice of results of the detection to the log server module 231 (reference numeral 209).

As shown in FIG. 3, a plurality of operation logs 301 to 303 can be stored in the operation log storage area 145 in the log server apparatus 141. As shown in an operation log example 320, operation contents, an operation subject and an operation result which can be generated from an event occurring on the web browser module 211, such as page display, mouse movement or click, keyboard input, or screen scroll, are recorded in the operation log besides the URL of the web page, operation time, and the operator (user name). However, all of these kinds of information may not necessarily be comprised in the operation log.

The log analysis module 232 includes a difference detection unit 304 for detecting a difference from these operation logs, a shortage detection unit 305 for detecting a shortage part, a frequency count unit 306 for counting a frequency of an operation or the like, a pattern detection unit 307 for detecting an operation pattern, a difference notice unit 314 for giving notice of those analysis results, a shortage notice unit 315, a frequency notice unit 316, and a pattern notice unit 317. By the way, functions comprised in the log analysis module 232 are not restricted to the functions shown in FIG. 3, but various functions of analyzing operation logs to obtain information may be comprised.

A log analysis result 210 (see FIG. 2) is, for example, a difference in operation contents or a difference in operation order between an operation log A 301 and an operation log B 302. As shown in FIG. 2, the log analysis result 210 is transmitted from the log server module 231 to the client apparatus 101, the web server apparatus 121, and the external apparatus 181 (which is not illustrated in FIG. 2). In the client apparatus 101, the script engine module 212, for example, changes display contents on the web browser module 211 in response to the log analysis result 210. In the web server apparatus 121, the contents change function module 225 conducts, for example, changes the response 202 in response to the log analysis result 210. In the external apparatus 181, a display program 186 displays, for example, the log analysis result 210 in response to the log analysis result 210.

A processing flow of an operability evaluation and improvement method conducted by the web application execution system 1000 in the first embodiment will now be described with reference to FIGS. 4 and 5.

FIG. 4 is a diagram showing a processing flow for generating an operation log (a first operation log) according to a manual (operation manual, the same shall apply hereinafter). The person who conducts this operation may be a developer, a user, or a person other than them.

Typically, if the web application is, for example, a business system, there is a manual in many cases. If the web application is, for example, a news site or a blog, however, there are no manuals in many cases. The manual may be a paper medium, or may be data to be displayed on a display part in a computer device. In the first embodiment, it is premised that there is a manual.

First, the web browser module 211 in the client apparatus 101 transmits a manual display request to the web server apparatus 121 (step 411). A manual display module 222 (corresponding to the manual display program 130) in the web server apparatus 121 receives the request from the client apparatus 101 and generates a response (step 431). The generation of the response may be conducted by the web server module 221.

Then, the function insertion module 223 executes the insertion of the operation log acquisition function by using the operation log acquisition function module 224 and the contents change by using the contents change function module 225 (step 432). The step 432 may be omitted, and only either the operation log acquisition function or the contents change function may be executed. If the operation log acquisition function is inserted, then a log of operations conducted by the user while watching a manual can be acquired and it is also possible to utilize the operation log of the web application without discrimination in the log server apparatus 141.

Then, the function insertion module 223 transmits the response to the client apparatus 101 (step 433). Hereafter, the steps 431 to 433 are collectively referred to as step 430. In the client apparatus 101, the web browser module 211 receives the response from the web server apparatus 121 (step 412). Hereafter, the steps 411 and 412 are collectively referred to as step 410.

In FIG. 4, the method for displaying the manual on the web browser after the step 412 by the steps 410 and 430 has been shown. Instead of relying upon the method, however, a method for displaying or referring to the manual may be used. For example, the user may refer to a manual printed on paper to execute ensuing processing.

Then, the web browser module 211 in the client apparatus 101 transmits a request for a web application to the web server apparatus 121 (step 414). The web server module 221 in the web server apparatus 121 receives the request from the client apparatus 101 and generates a response of the web application (step 435). Then, steps 436 and 437 are executed in the same way as the steps 432 and 433. Hereafter, the steps 435 to 437 are collectively referred to as step 434. If a request end is not received from the client apparatus 101 and the web server apparatus 121 does not come to an end (No at step 438), then the web server apparatus 121 returns to the step 434. If the request end is received from the client apparatus 101 or the web server apparatus 121 comes to an end (Yes at the step 438), then the web server apparatus 121 finishes the processing.

The client apparatus executes step 415 in the same way as the step 412. Hereafter, the steps 414 and 415 are collectively referred to as step 413.

Then, in the client apparatus 101, the user conducts operation on the web browser in accordance with the manual displayed at the step 410, and the operation log acquisition function generates an operation log, and transmits the operation log to the log server apparatus 141 (step 416). If the operations come to an end or the web server apparatus 121 comes to an end (Yes at the step 417), then the client apparatus comes to an end. Otherwise (No at the step 417) the client apparatus 101 returns to the step 413.

The log server module 231 in the log server apparatus 141 receives an operation log from the client apparatus 101, and stores the operation log in the operation log A 301 in the operation log storage area 145 (step 441). If there is the next operation log (Yes at step 442), then the step 441 is executed repetitively. Otherwise (No at the step 442) the processing is finished. Owing to execution of the processing flow described heretofore, the operation log according to the manual is stored in the area of the operation log A 301 included in the operation log storage area 145 in the log server apparatus 141 as a first operation log. Hereafter, the processing flow shown in FIG. 4 is collectively referred to as step 460.

A processing flow for evaluating operability of a web application in large amounts, continuously with high precision by comparing an operation log according to a manual with a user's operation log will now be described with reference to FIG. 5. In other words, it is now premised that the operation log according to the manual is a correct answer (an ideal operation log).

Subsequently to the step 460 (processing 460, the same shall apply hereinafter), the step 413 and the step 434 are executed respectively in the client apparatus 101 and the web server apparatus 121, and a response of the web application is displayed on the client apparatus 101. In the client apparatus 101, the operation log acquisition function inserted in the web server apparatus 121 generates an operation log (a second operation log) on the basis of operations on the web browser, and transmits the operation log to the log server apparatus 141 (step 502). Hereafter, the steps 413 and 502 are collectively referred to as step 503.

In the log serve apparatus 141, the log server module 231 receives an operation log from the client apparatus 101 (step 542), and the log analysis module 232 reads the operation log A 301 generated at the step 460 from the operation log storage area 145 (step 543). At the step 543, an operation log on the same web page as that of the operation log received at the step 542 is read. Hereafter, the steps 542 and 543 are collectively referred to as step 544.

Then, the difference detection unit 304 in the log analysis module 232 detects a difference between the two operation logs received and read at the step 544 (step 545). If there is a difference (Yes at the step 545), then the difference notice unit 314 in the log analysis module 232 gives notice of difference occurrence information (difference information) to at least one of the web server apparatus 121, the client apparatus 101 and the external apparatus 181 via the log server module 231 (step 546).

If the client apparatus 101 or the web server apparatus 121 comes to an end (Yes at step 547), the processing is finished. Otherwise (No at the step 547) the processing returns to the step 544.

If there is a notice from the log server apparatus 141 (Yes at step 504), then the client apparatus 101 outputs the received difference occurrence information to the input/output device 102 (step 505). As for the outputting to the input/output device 102, for example, a method of transmitting the information as electronic mail and a method of displaying the information on the console screen can be mentioned. However, the outputting method is not restricted to them. If there is a notice from the log server apparatus 141 (Yes at step 522), the web server apparatus 121 also outputs the received difference occurrence information to the input/output device 126 at step 523 in the same way as the step 505. In the case of the external apparatus 181, the notice may be displayed by using a method of, blinking PATLITE (registered trademark, which means rotary beacon light).

If the operations come to an end or the web server apparatus 121 comes to an end (Yes at step 506), then the client apparatus 101 finishes the processing. Otherwise (No at the step 506) the client apparatus 101 returns to the step 503.

If a request end is received from the client apparatus 101 or the web server apparatus 121 comes to an end (Yes at step 524), then the web server apparatus 121 finishes the processing. Otherwise (No at the step 524) the web server apparatus 121 returns to the step 434.

Owing to the processing flow described heretofore, operations on the client apparatus 101 can be acquired continuously with ease. In addition, it is possible to cope with the case where there are a large number of client apparatuses 101, and individual operations can be recorded in detail. And operation logs in the client apparatus 101 and operation logs according to the manual can be compared in large amounts continuously. Since the comparison can be conducted between operation logs generated by the same operation log acquisition function, evaluation with high precision becomes possible.

(Second Embodiment)

A second embodiment will now be described with reference to FIGS. 6, 7A and 7B. Only differences from the first embodiment will be described. Parts described in the first embodiment are denoted by the same characters, and description of them will be omitted.

FIG. 6 is a diagram showing a processing flow for evaluating operability of a web application in large amounts continuously with high precision and improving the operability, by comparing an operation log according to a manual with a user's operation log.

FIG. 6 differs from FIG. 5 in the first embodiment in step 605 included in the processing flow of the client apparatus 101 and step 623 included in the processing flow of the web server apparatus 121.

First, at the step 605 in the client apparatus 101, the web browser module 211 receives the difference occurrence information from the log server apparatus 141, and displays the difference occurrence information on a web page. Specifically, the script engine module 212 in the client apparatus 101 receives the difference occurrence information via the web browser module 211, and a script code operating on the script engine module 212 generates a display depending upon the difference occurrence information on the web browser. As a result, the display on the web page is implemented.

At the step 623 in the web server apparatus 121, the contents change function module 225 changes contents of the response by utilizing the difference occurrence information received from the log server apparatus 141, and consequently the display on the web browser is changed.

FIGS. 7A and 7B show an example of a concrete display change. First, as an example 701 (FIG. 7A) of the difference occurrence information, difference occurrence contents and contents of the operation log according to the manual (operations recorded in the operation log A) can be mentioned besides a URL of the web page. The pertinent page can be discriminated on the basis of the URL of the web page, and the pertinent place can be discriminated on the basis of the difference occurrence contents of the difference occurrence information. Contents to be displayed can be determined on the basis of the contents of the operation log according to the manual.

As an example of the display change, display of difference occurrence contents using a pop-up window or a dialog box (reference numeral 704) on the web browser screen 703 (FIG. 7B) in the client apparatus 101 can be mentioned. As another example, a method (reference numeral 705) of displaying a place to be operated in the case of an operation according to the manual, and highlighting (reference numeral 706) of the place where the difference has occurred can be mentioned. However, the display method is not restricted to them, but all cases where display is changed by the difference occurrence information are included.

Owing to the processing flow described heretofore, methods for evaluating and improving operability which presents an operation according to the manual intelligibly when a mistake or a doubt has occurred in operation, by comparison with the operation log according to the manual can be provided in large amounts continuously with high precision.

(Third Embodiment)

A third embodiment will now be described with reference to FIGS. 8 and 9. Only differences from the first embodiment will be described. Parts described in the first embodiment are denoted by the same characters, and description of them will be omitted.

FIG. 8 is a diagram showing a processing flow for generating an operation log (third operation log) which has occurred with a high frequency from operation logs of a plurality of users. In other words, in a scene in which the operation log which has occurred with a high frequency can become a correct answer (an ideal operation log), such processing becomes effective. It is, for example, the case where there are no manuals, or the case where a manual, if any, has become stale because of, for example, a change of contents.

FIG. 8 differs from FIG. 5 in the first embodiment in that the processing 460 is removed, the steps 544, 545 and 546 in the log server apparatus 141 are replaced by steps 842 to 844, and the steps 504 and 505 in the client apparatus 101 and the 522 and 523 in the web server apparatus 121 are removed.

Upon receiving an operation log from the client apparatus 101 (step 842), the log server module 231 in the log server apparatus 141 stores the operation log by adding it to the operation log B 302 in the operation log storage area 145 (step 843). Subsequently, the log analysis module 232 reads at least one operation log stored in the operation log B 302, and the pattern detection unit 307 in the log analysis module 232 extracts an operation pattern which has occurred with a high frequency in the read operation log, and stores the operation pattern in the operation log C 303 (step 844).

By the way, the read operation log is an operation log on the same web page. Operation logs on a plurality of web pages having the same access order may be read collectively. Furthermore, it is also possible to cope with a change of the web application by reading only a new operation log without reading operation logs. There are a large number of methods for implementing the pattern detection unit 307. For example, a method of extracting an operation pattern assuming a high order in ranking by ranking operation patterns can be mentioned. However, the method is not restricted to this, but any method may be used as long as an operation pattern which has occurred with a high frequency is extracted from among a plurality of operation logs.

Figure 9:
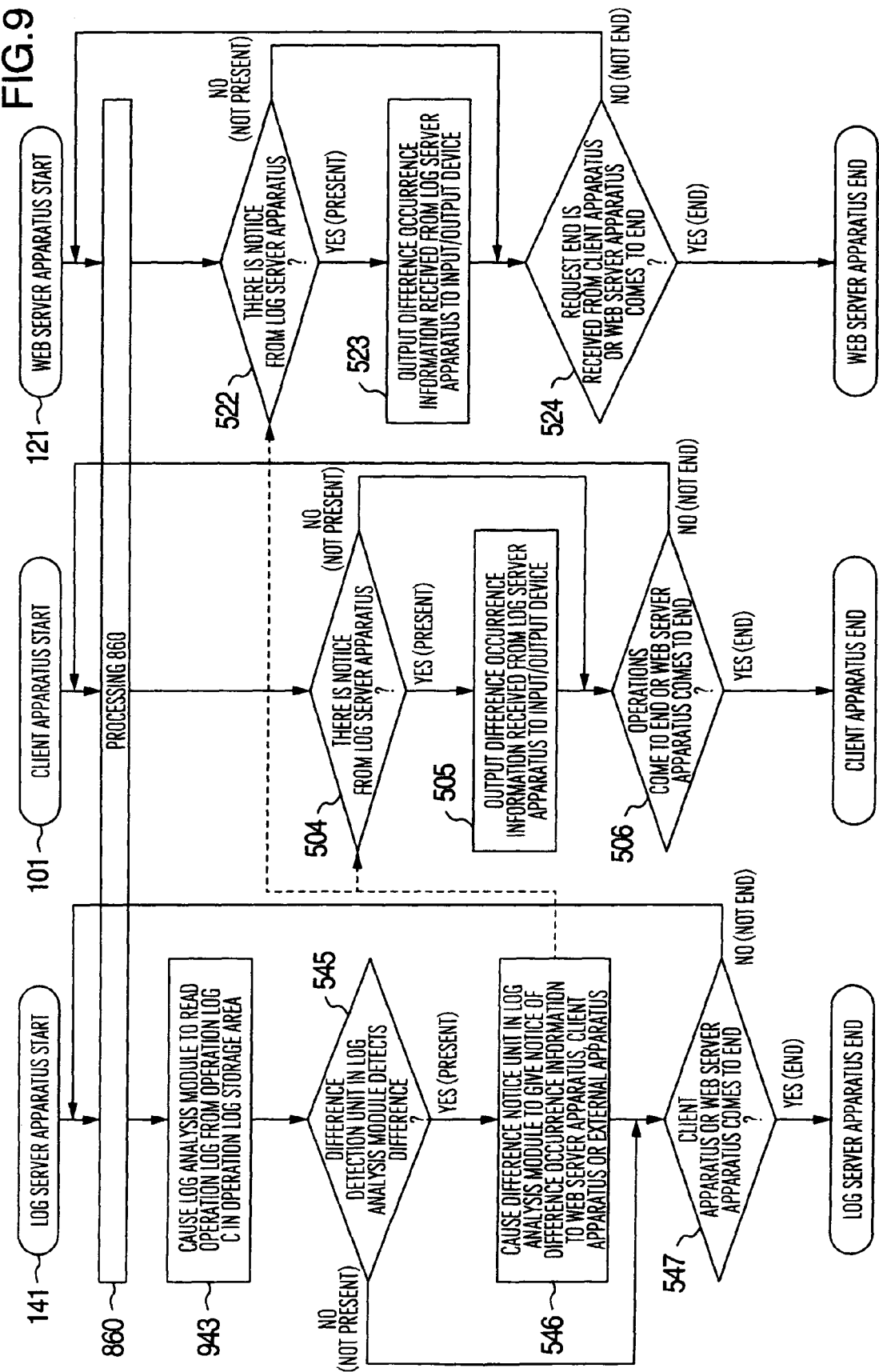
FIG. 9 is a processing flow diagram of operability evaluation in the third embodiment.

FIG. 9 is a diagram showing a processing flow for evaluating operability of a web application in large amounts continuously with high precision by comparing an operation pattern which has occurred with a high frequency with the user's operation log and making possible evaluation even in a web application comprising dynamic contents.

FIG. 9 differs from FIG. 5 in the first embodiment in that the processing 460 is replaced by processing 860 to generate an operation pattern which has occurred with a high frequency on the basis of operations on the browser module 211 in the client apparatus 101, the step 544 in the log server apparatus 141 is replaced by step 943, the step 503 in the client apparatus 101 is removed, and the step 434 in the wave server apparatus 121 is removed.

In the log server apparatus 141, the log analysis module 232 reads the operation log (the third operation log) from the operation log C 303 in the operation log storage area 145 at the step 943. Then, the difference detection unit 304 in the log analysis module 232 compares the operation log received from the client apparatus 101 with the third operation log (step 545).

Owing to the processing flow described heretofore, user's operability can be evaluated with high precision even in an application comprising dynamic contents, in addition to the feature of the first embodiment. In other words, even when the manual change is too late for the contents change, the evaluation can be conducted suitably by using an operation log which has occurred with a high frequency.

(Fourth Embodiment)

A fourth embodiment will now be described with reference to FIG. 10. Only differences from the third embodiment will be described. Parts described in the third embodiment are denoted by the same characters, and description of them will be omitted.

Figure 10:
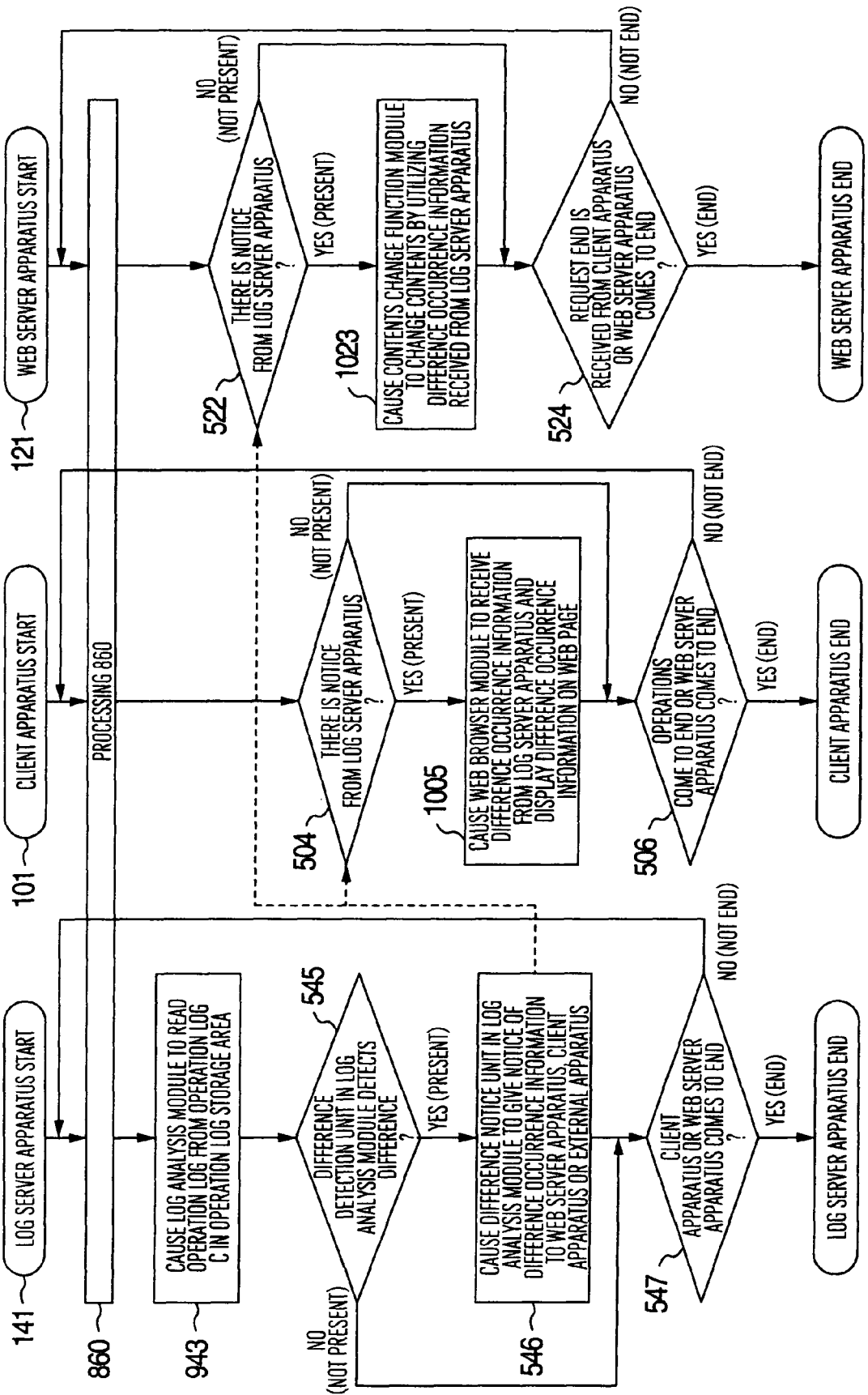
FIG. 10 is a processing flow diagram of operability evaluation in the fourth embodiment.

FIG. 10 is a diagram showing a processing flow for evaluating operability of a web application in large amounts continuously with high precision by comparing an operation log comprised in an operation pattern which has occurred with high precision with a user's operation log, and improving the operability.

FIG. 10 differs from FIG. 9 in the third embodiment in that the step 505 in the client apparatus 101 is replaced by step 1005 and the step 523 in the web server apparatus 121 is replaced by step 1023.

First, at the step 1005 in the client apparatus 101, the web browser module 211 receives difference occurrence information from the log server apparatus 141, and displays the difference occurrence information on a web page. Specifically, the script engine module 212 in the client apparatus 101 receives the difference occurrence information via the web browser module 211, and a script code operating on the script engine module 212 generates display depending upon the difference occurrence information, on the web browser. As a result, the display on the web page is implemented.

At the step 1023 in the web server apparatus 121, the contents change function module 225 changes contents of the response by utilizing the difference occurrence information received from the log server apparatus 141, and consequently the display on the web browser is changed.

An example of the concrete display change is similar to that shown in FIGS. 7A and 7B. However, "operation log recorded in operation log A 301" described in the "example of difference occurrence information" 701 is replaced by "operation log recorded in operation log C 303." In addition, contents displayed in the pop-up window or the dialog box (reference numeral 704) are not contents obtained by comparison with the manual, but are contents obtained by comparison with an operation pattern which has occurred with a high frequency.

Owing to the processing flow described heretofore, methods for improving operability which intelligibly presents an operation which has occurred with a high frequency when a mistake or a doubt has occurred in operation, by comparing an operation log comprised in the operation pattern which has occurred with a high frequency with a user's operation log can be provided in large amounts continuously with high precision.

(Fifth Embodiment)

A fifth embodiment will now be described with reference to FIG. 11. Only differences from the third embodiment will be described. Parts described in the third embodiment are denoted by the same characters, and description of them will be omitted.

Figure 11:
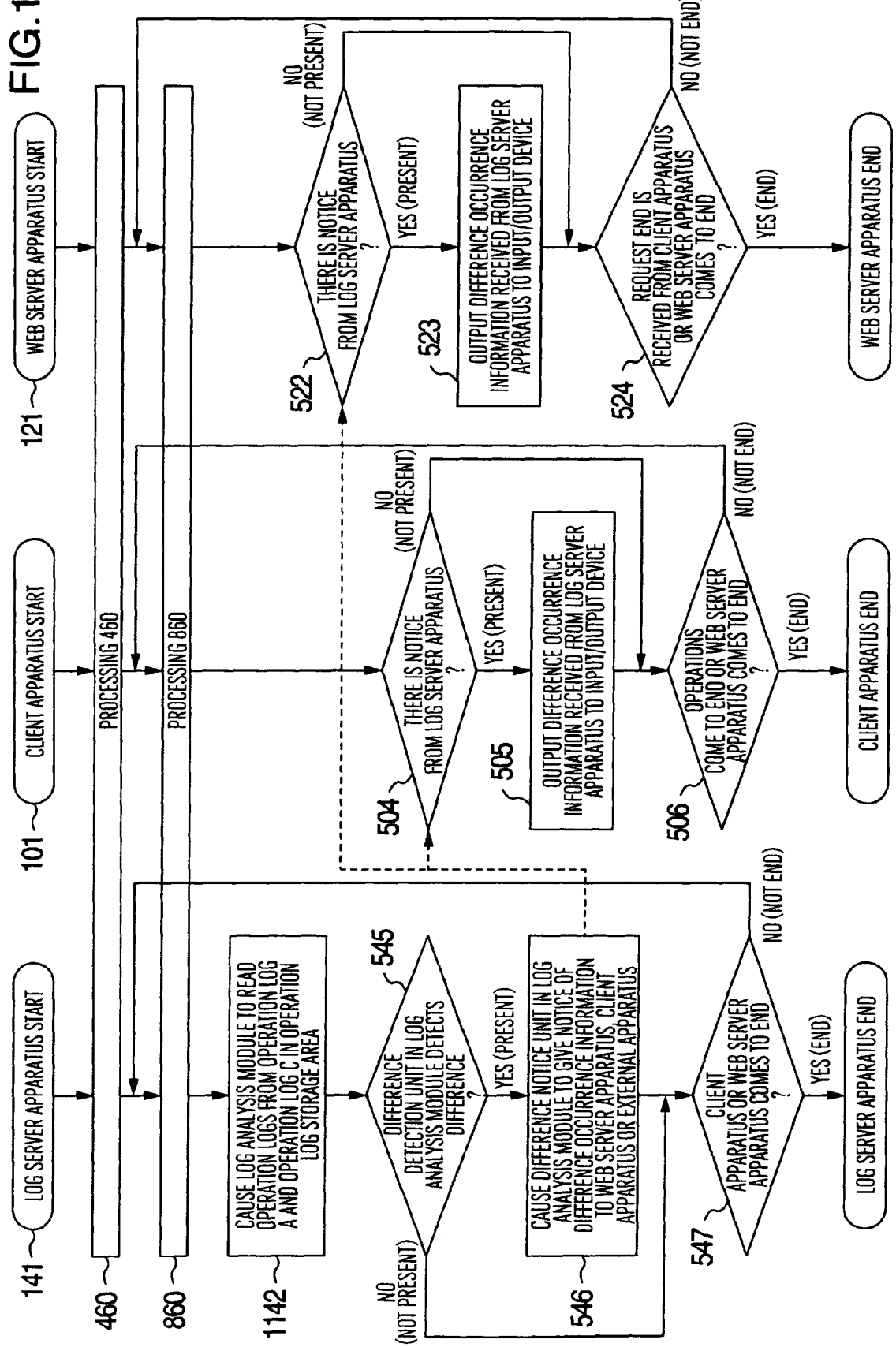
FIG. 11 is a processing flow diagram of operability evaluation in the fifth embodiment.

FIG. 11 is a diagram showing a processing flow for evaluating operability of a web application in large amounts continuously with high precision by comparing an operation log according to a manual with an operation log comprised in an operation pattern which has occurred with a high frequency.

FIG. 11 differs from FIG. 9 in the third embodiment in that step 860 is added to generate an operation pattern which has occurred with a high frequency on the basis of operations on the browser module 211 in the client apparatus 101, the log analysis module 232 reads operation logs from the operation log A 301 and the operation log C 303 in the operation log storage area 145 (step 1142), and a subject to be compared with the first operation log read from the operation log A 301 in the operation log storage area 145 is the third operation log generated at the step 860 and stored in the operation log C303 (step 545).

As a result, difference occurrence information is generated when operations different from operations described in the manual have occurred in large amounts, and consequently the evaluation precision is improved as compared with the first embodiment. In other words, the possibility that the difference occurrence information will be generated by conducting an operation different from the operation described in the manual only once is low. The difference occurrence information is generated only when different operations are conducted repeatedly. As a result, it becomes possible to evaluate the case where mistakes in the manual or operation mistakes are apt to occur, with high precision.

Owing to the processing flow described heretofore, methods for evaluating operability of a web application by comparing an operation log according to a manual with an operation log comprised in an operation pattern which has occurred with a high frequency can be provided in large amounts continuously with high precision.

(Sixth Embodiment)

A sixth embodiment will now be described with reference to FIGS. 12, 13A and 13B. Only differences from the fifth embodiment will be described. Parts described in the fifth embodiment are denoted by the same characters, and description of them will be omitted.

Figure 12:
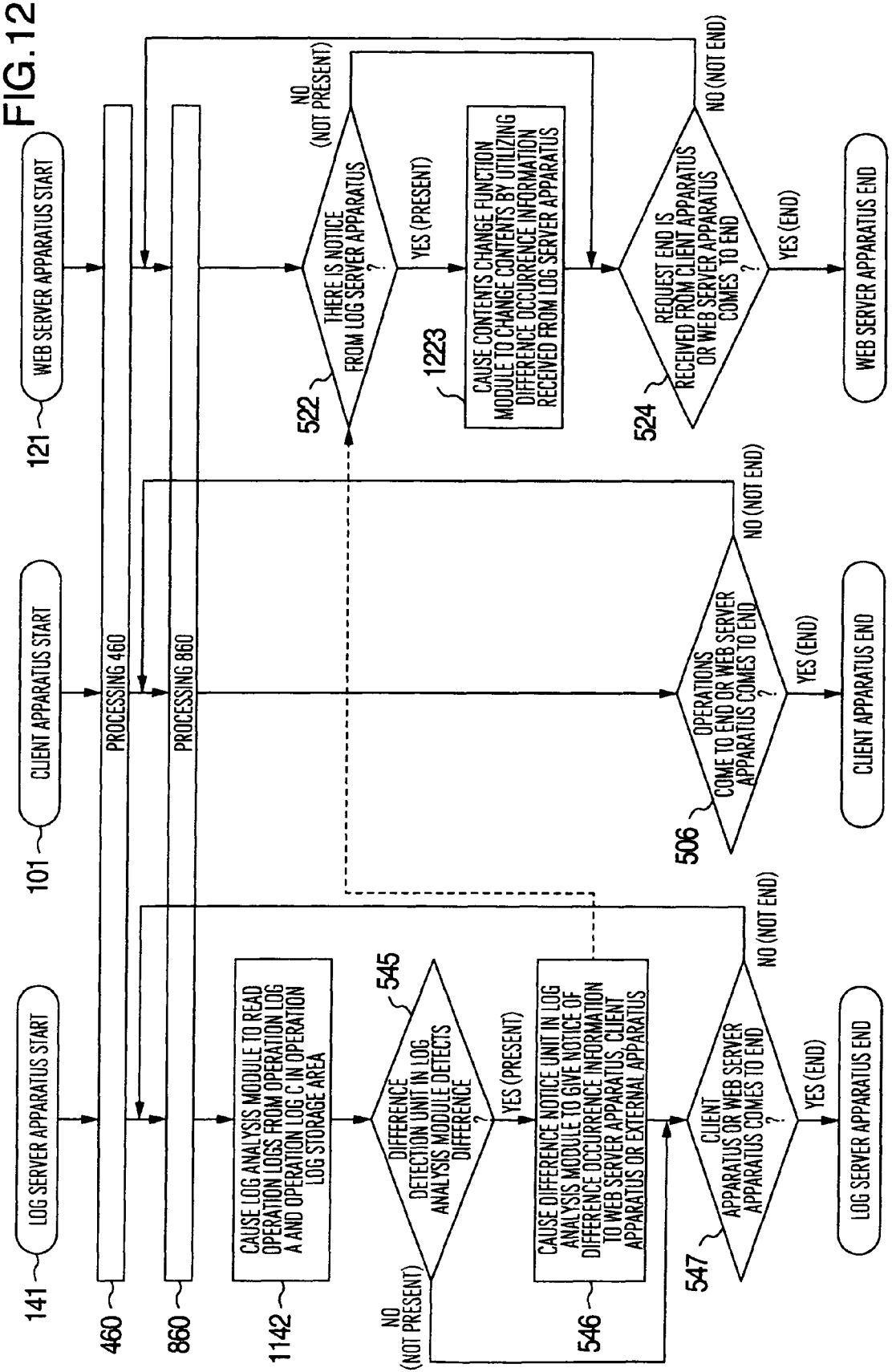
FIG. 12 is a processing flow diagram of operability improvement in the sixth embodiment.

FIG. 12 is a diagram showing a processing flow for evaluating operability of a web application in large amounts continuously with high precision by comparing an operation log according to a manual with an operation log comprised in an operation pattern which has occurred with a high frequency and improving the operability.

FIG. 12 differs from FIG. 11 in the fifth embodiment in that a notice of difference occurrence information is given only to the web server apparatus 121 at the step 546 in the log server apparatus 141 (the steps 504 and 505 in the client apparatus 101 are removed), and the step 523 in the web server apparatus 121 is replaced by step 1223 (the contents change function module 225 changes the manual by utilizing the difference occurrence information received from the log server apparatus 141).

FIGS. 13A and 13B are diagrams showing an example of a change made on the manual on the basis of the difference occurrence information.

First, FIG. 13A shows an example 1301 of difference occurrence information. The URL of the web page and difference occurrence contents are comprised in the difference occurrence information. Contents of the first operation log recorded in the operation log A 301 and contents of the third operation log recorded in the operation log C 303 are comprised in a difference part. The pertinent page in a manual 1302 (FIG. 13B) can be discriminated on the basis of the URL of the web page and the contents of the first operation log recorded in the operation log A 301, and the pertinent place in the manual can be discriminated on the basis of the difference occurrence contents of the difference occurrence information.

An example of the manual change is as follows: if an operation which is not written in the manual has occurred with a high frequency, then contents of the missing operation are added to a pertinent part 1303 of the manual. In the example shown in FIGS. 13A and 13B, operation subjects and an operation result are highlighted (1304). As another example, a method of interchanging the order of operations when the order of operations described in the manual is different from that in an operation pattern which occurs with a high frequency, or a method of highlighting a place in the manual where an operation omission occurs with a high frequency can be mentioned. However, the display method is not restricted to them, but all cases where the manual is changed by the difference occurrence information are included.

Owing to the processing flow described heretofore, operability improving methods for improving mistakes in the manual and unintelligible parts so as to become intelligible by comparing the operation log according to the manual with an operation log comprised in an operation pattern which has occurred with a high precision can be provided in large amounts continuously with high precision.

(Seventh Embodiment)

A seventh embodiment will now be described with reference to FIGS. 14 to 16. Only differences from the sixth embodiment will be described. Parts described in the sixth embodiment are denoted by the same characters, and description of them will be omitted.

Figure 14:
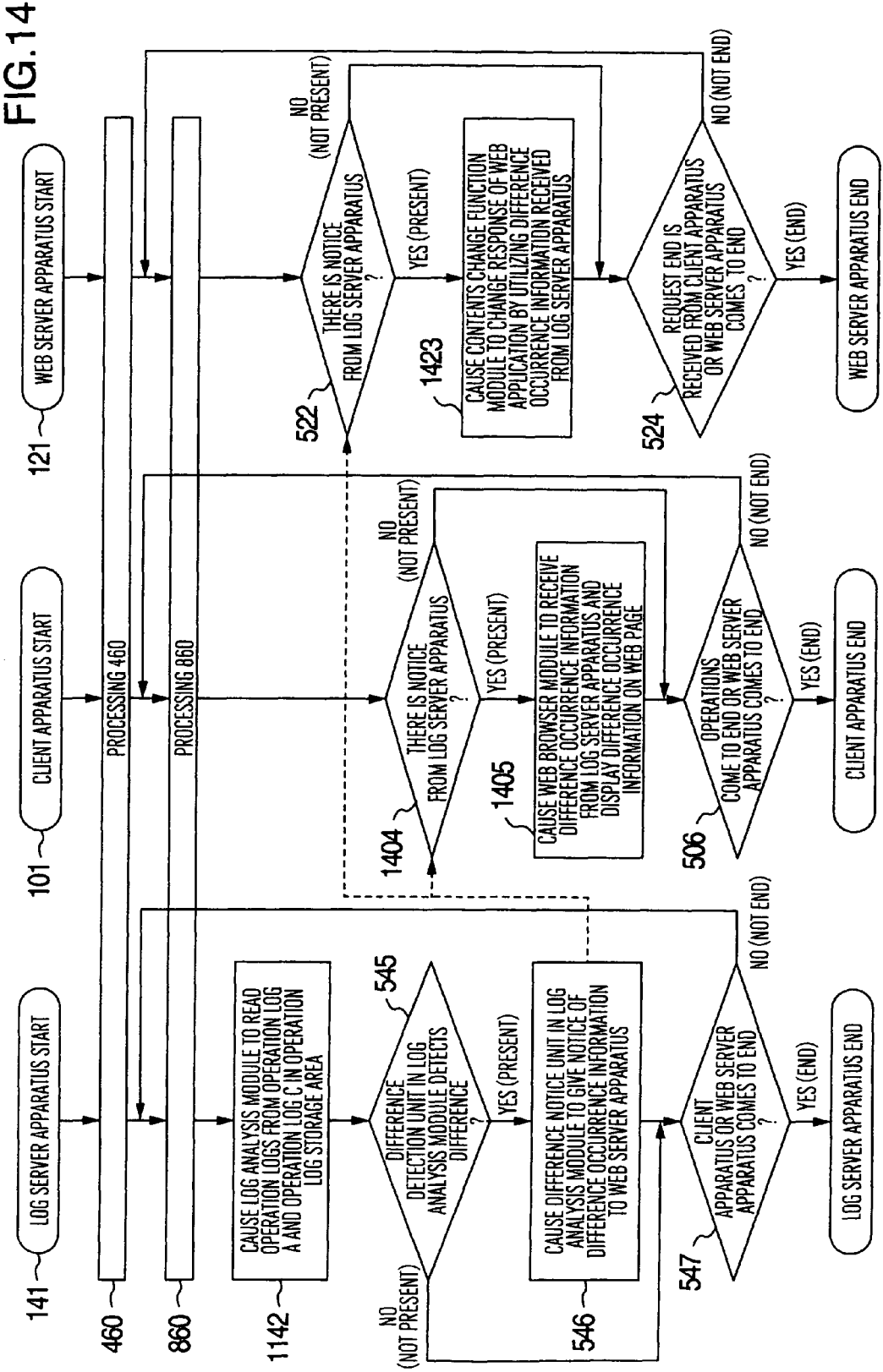
FIG. 14 is a processing flow diagram of operability improvement in the seventh embodiment.

FIG. 14 is a diagram showing another processing flow for evaluating operability of a web application in large amounts continuously with high precision by comparing an operation log according to a manual with an operation log comprised in an operation pattern which has occurred with a high frequency and improving the operability.

FIG. 14 differs from FIG. 12 in the sixth embodiment in that a notice of difference occurrence information is given to the web server apparatus 121 as well and the display on the web browser module 211 is changed in the same way as the second embodiment and the fourth embodiment (steps 1404 and 1405), and the contents change function module 225 changes the response of the web application by utilizing the difference occurrence information received from the log server apparatus 141 (step 1423).

FIGS. 15A and 15B show an example of a concrete display change. First, as an example 1501 (FIG. 15A) of the difference occurrence information, difference occurrence contents (the example in FIG. 15A shows the case where an operation omission occurs with a high frequency), contents of the operation log A according to the manual, and contents of the operation log C in the operation pattern which has occurred with a high frequency can be mentioned besides a URL of the web page. The pertinent page can be discriminated on the basis of the URL of the web page, and the pertinent place can be discriminated on the basis of the difference occurrence contents of the difference occurrence information.

As an example of the display change, a method of highlighting 1504 of the place where an operation omission occurs with a high frequency on a web browser screen 1503 (FIG. 15B) in the client apparatus 101 and presentation 1505 of an operation candidate can be mentioned. However, the display method is not restricted to them, but all cases where display is changed by the difference occurrence information are included.

FIGS. 16A and 16B show another example of a concrete display change. First, as an example 1601 (FIG. 16A) of the difference occurrence information, difference occurrence contents (the example in FIG. 16A shows the case where an operation mistake occurs with a high frequency), contents of the operation log A according to the manual, and contents of the operation log C in the operation pattern which has occurred with a high frequency can be mentioned besides a URL of the web page. The pertinent page can be discriminated on the basis of the URL of the web page, and the pertinent place can be discriminated on the basis of the difference occurrence contents of the difference occurrence information.

As an example of the display change, a method responsive to operation of a place where an operation mistake occurs with a high frequency on a web browser screen 1603 (FIG. 16B) in the client apparatus 101, for displaying a pop-up window or a dialog box 1604 to confirm operation contents. However, the display method is not restricted to them, but all cases where display is changed by the difference occurrence information are included.

Owing to the processing flow described heretofore, methods for evaluating operability of a web application by comparing an operation log according to a manual with an operation log comprised in an operation pattern which has occurred with a high frequency can be provided in large amounts continuously with high precision.

Combinations of the first to seventh embodiments described heretofore are also included in the present invention.

Each of the first to seventh embodiments merely shows an example. For example, contents of the log analysis implemented by the log analysis module 232 are not restricted to the contents of each embodiment, but, in general, an implementation form in which a plurality of operation logs are compared and a quantitative numerical value is output as an analysis result is also included. As for information which might be comprised in an operation log, all information which can be recorded on the web browser becomes a subject. Although only the case where every apparatus is one in number has been described, the case where each apparatus is a plurality in number and the case where a plurality of apparatuses are put together in a less number are also included.

Although description of the embodiments is now finished, modes of the present invention are not restricted to them.

For example, the embodiments have been described by taking the script engine as an example of the program execution engine (an environment in which a program is executed). Alternatively, the program execution engine may be executed by using the Java (registered trademark) virtual machine or the like.

As the correct answer (the ideal operation log), an operation log which has occurred with a high frequency has been used besides an operation log according to the manual. Alternatively, however, an operation log of a person who is short in operation time or a previously specified expert, or an operation log of a specific person in net shopping (such as a person who has a large amount of actual results of purchase or who has a large amount of balance at the bank) may be used.

Besides, the concrete configuration of hardware or programs can be changed suitably without departing from the spirit of the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A management method of a web application executed in a web system in which a web server apparatus for executing a web application in response to a request from a client apparatus having a web browser and causing the web browser to display a web page, and a log server apparatus for conducting collection, storage and analysis of operation logs on the web browser are connected to each other via a network,
wherein the web server apparatus has a function of inserting an operation log acquisition function operating on a program execution engine accompanying the web browser into a response output from the web server apparatus, wherein an operation log is obtained by recording operations on the web browser by the operation log acquisition function and is transmitted from the client apparatus to the log server apparatus, wherein the log server apparatus is configured to conduct storage and analysis of the received operation log and transmit a result of the analysis to outside,
wherein the log server apparatus stores an operation log obtained when the web application is operated on the web browser in accordance with a manual having a description of an operation method of the web application, as a first operation log,
wherein the log server apparatus stores another operation log obtained when the web application is operated in the client apparatus, as a second operation log, and
the log server apparatus includes a pattern detection function that detects an operation pattern which has occurred with a high frequency from a plurality of stored operation logs, the log server apparatus detects an operation pattern which has occurred with a high frequency from the second operation log by using the pattern detection function and stores the operation pattern as a third operation log, wherein the log server apparatus conducts the operation log comparison by utilizing the first operation log or the second operation log and utilizing the third operation log, and if there is a difference portion between them, transmits difference information to the web server apparatus, the client apparatus or another external apparatus, wherein the web server apparatus includes a contents change function that changes the manual or the contents, wherein the web server apparatus changes contents of the manual in accordance with the difference information obtained by the comparison between the first operation log and the third operation log by the contents change function, and wherein the web server apparatus changes contents of the response in accordance with the difference information obtained by comparison between the second operation log and the third operation log.

2. The web application management method according to claim 1, wherein the difference information comprises contents of the first operation log and contents of the third operation log in the difference part, the web server apparatus extracts a pertinent part of the manual on the basis of the contents of the first operation log comprised in the difference information, and adds a difference part between the first operation log and the third operation log comprised in the difference information to the pertinent part of the contents of the manual or corrects or deletes the pertinent part, by using the contents change function.

3. The web application management method according to claim 2, wherein the web server apparatus has a contents change function of changing contents comprised in a response of the web application, the difference information transmitted from the log server apparatus comprises contents of the first operation log and contents of the third operation log in the difference part, and the web server apparatus extracts a pertinent part of contents of the web application corresponding to a difference part between the first operation log and the third operation log comprised in the difference information, and changes display of the pertinent part of the contents comprised in the response of the web application so as to be conspicuous.

4. The web application management method according to claim 3, wherein the web server apparatus has a contents change function of changing contents comprised in a response of the web application, the difference information transmitted from the log server apparatus comprises contents of the first operation log and contents of the third operation log in the difference part, and the web server apparatus extracts a pertinent part of contents of the web application corresponding to a difference part between the first operation log and the third operation log comprised in the difference information, and inserts a function of conducting display to prompt confirmation of operation contents when the pertinent part of the contents comprised in the response of the web application has been operated, into the response.

5. A web system wherein a web server apparatus for executing a web application in response to a request from a client apparatus having a web browser and causing the web browser to display a web page, and a log server apparatus for conducting collection, storage and analysis of operation logs on the web browser are connected to each other via a network, wherein the web server apparatus is configured with a function of inserting an operation log acquisition function operating on a program execution engine accompanying the web browser into a response output from the web server apparatus, wherein an operation log is obtained by recording operations on the web browser by the operation log acquisition function and is transmitted from the client apparatus to the log server apparatus, wherein the log server apparatus is configured to conduct storage and analysis of the received operation log and transmit a result of the analysis to outside, wherein the log server apparatus is configured to store an operation log obtained when the web application is operated on the web browser in accordance with a manual having a description of an operation method of the web application, as a first operation log, wherein the log server apparatus is configured to store another operation log obtained when the web application is operated in the client apparatus, as a second operation log, and wherein the log server apparatus includes a pattern detection function that is configured to detect an operation pattern which has occurred with a high frequency from a plurality of stored operation logs, wherein the log server apparatus is configured to detect an operation pattern which has occurred with a high frequency from the second operation log by using the pattern detection function and stores the operation pattern as a third operation log, wherein the log server apparatus is configured to conduct the operation log comparison by utilizing the first operation log or the second operation log and utilizing the third operation log and if there is a difference portion between them, to transmit difference information to the web server apparatus, the client apparatus or another external apparatus, wherein the web server apparatus includes a contents change function that is configured to change the manual or the contents, wherein the web server apparatus is configured to change contents of the manual in accordance with the difference information obtained by the comparison between the first operation log and the third operation log by the contents change function, and wherein the web server apparatus is configured to change contents of the response in accordance with the difference information obtained by comparison between the second operation log and the third operation log.

6. The web system according to claim 5, wherein the difference information comprises contents of the first operation log and contents of the third operation log in the difference part, the web server apparatus is configured to extract a pertinent part of the manual on the basis of the contents of the first operation log comprised in the difference information, and to add a difference part between the first operation log and the third operation log comprised in the differ ence information to the pertinent part of the contents of the manual or correct or delete the pertinent part, by using the contents change function.

7. The web system according to claim 6, wherein
the web server apparatus has a contents change function that is configured to change contents comprised in a response of the web application,
the difference information transmitted from the log server apparatus comprises contents of the first operation log and contents of the third operation log in the difference part, and
the web server apparatus is configured to extract a pertinent part of contents of the web application corresponding to a difference part between the first operation log and the third operation log comprised in the difference information, and changes display of the pertinent part of the contents comprised in the response of the web application so as to be conspicuous.

8. The web system according to claim 7, wherein
the web server apparatus has a contents change function that is configured to change contents comprised in a response of the web application,
the difference information transmitted from the log server apparatus comprises contents of the first operation log and contents of the third operation log in the difference part, and
the web server apparatus is configured to extract a pertinent part of contents of the web application corresponding to a difference part between the first operation log and the third operation log comprised in the difference information, and insert a function of conducting display to prompt confirmation of operation contents when the pertinent part of the contents comprised in the response of the web application has been operated, into the response.

* * * * *